United States Patent
Jonsson

(10) Patent No.: US 6,609,224 B1
(45) Date of Patent: Aug. 19, 2003

(54) REPLACEMENT OF TRANSPORT-LAYER CHECKSUM IN CHECKSUM-BASED HEADER COMPRESSION

(75) Inventor: Lars-Erik Jonsson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 09/657,350

(22) Filed: Sep. 7, 2000

Related U.S. Application Data

(60) Provisional application No. 60/180,302, filed on Feb. 4, 2000.

(51) Int. Cl.[7] .......................... H03M 13/00; G06F 11/10
(52) U.S. Cl. ....................... 714/758; 714/776; 714/807
(58) Field of Search ................................ 714/776, 758, 714/807

(56) References Cited

U.S. PATENT DOCUMENTS

| | | | |
|---|---|---|---|
| 5,627,829 A | | 5/1997 | Gleeson et al. ............. 370/230 |
| 5,850,526 A | | 12/1998 | Chou .................... 395/200.77 |
| 5,935,268 A | * | 8/1999 | Weaver ...................... 714/758 |
| 5,987,022 A | * | 11/1999 | Geiger et al. ............... 370/349 |
| 6,032,197 A | * | 2/2000 | Birdwell et al. ........... 709/247 |
| 6,198,735 B1 | * | 3/2001 | Pazhyannur et al. ........ 370/349 |
| 6,208,651 B1 | * | 3/2001 | Van Renesse et al. ...... 370/392 |
| 6,314,095 B1 | * | 11/2001 | Loa ............................ 370/352 |
| 6,438,137 B1 | * | 8/2002 | Turner et al. ............... 370/466 |
| 6,477,669 B1 | * | 11/2002 | Agarwal et al. ............ 714/708 |

FOREIGN PATENT DOCUMENTS

| | | |
|---|---|---|
| WO | WO 00/11849 | 3/2000 |
| WO | WO 00/69139 | 11/2000 |

OTHER PUBLICATIONS

Mikael Degermark, et al.; "Low–loss TCP/IP Header Compression for Wireless Networks"; MOBICOM 1996; 14 pages.
Barani Subbiah, et al.; "RTP Payload Multiplexing between IP Telephony Gateways"; Global Telecommunications Conference; Globecom 1999; pp. 1121–1127.
G. Mamais, et al.; "Evaluation of the Casner–Jacobson Algorithm for Compressing the RTP/UDP/IP Headers"; ISCC 1998; 6 pages.
Stephen J. Perkins, et al.; "Dependency Removal for Transport Protocol Header Compression over Noisy Channels"; IEEE 1997; pp. 1025–1029.
ISR PCT/SE 01/00196; Dated Jul. 17, 2001.
Postel, J. "User Datagram Protocol". RFC: 768. Aug. 28, 1980. <http://www.cis.ohio–state.edu/htbin/rfc768.html>.
Postel, J. "Internet Protocol: Darpa Internet Program, Protocol Specification". RFC: 791. Sep. 1981. <http://www.faqs.org/rfcs/rfc791.html>.
Schulzrinne, H. "RTP: A Transport Protocol for Real–Time Applications". RFC: 1889. Jan. 1996. <http://www.faqs.org/rfcs/rfc1889.html>.

* cited by examiner

Primary Examiner—Emmanuel L. Moise
Assistant Examiner—Anthony T. Whittington
(74) Attorney, Agent, or Firm—Jenkens & Gilchrist, P.C.

(57) ABSTRACT

A method and apparatus for replacing a transport layer header error detection code and a header compression algorithm error detection code with a one error detection code. The replacement error detection code covers both the transport layer header and the transport layer payload. Such an arrangement reduces the amount of as-is or uncompressed information transmitted, thereby reducing the required bandwidth. The replacement error detection code is subsequently used to verify the correctness of both the reconstructed header and the payload.

13 Claims, 5 Drawing Sheets

REPLACEMENT OF TRANSPORT-LAYER CHECKSUM IN CHECKSUM-BASED HEADER COMPRESSION

CROSS-REFERENCES TO RELATED APPLICATIONS

This Application for Patent claims the benefit of priority from, and hereby incorporates by reference the entire disclosure of, U.S. Provisional Application for Patent Serial No. 60/180,302, filed Feb. 4, 2000.

BACKGROUND OF THE PRESENT INVENTION

1. Field of the Invention

The invention relates generally to packet header compression and, more particularly, to replacement of the transport layer checksum in a packet header compression algorithm.

2. Description of the Related Art

The tremendous success of the Internet has made it desirable to expand the Internet Protocol (IP) to a wide variety of applications including voice and speech communication. The objective is, of course, to use the Internet as a link for transporting voice and speech data. Speech data is presently transported over the Internet using IP-based transport layer protocols such as the User Datagram Protocol (UDP) and the Real-time Transport Protocol (RTP). In a typical application, a computer running telephony software converts speech into digital data which is then assembled into data packets suitable for transport over the Internet using the IP-based transport layer protocols. Additional information regarding the UDP and RTP transport layer protocols may be found in the following publications: Jon Postel, *User Datagram Protocol*, DARPA RFC 786, August 1980; Henning Schulzrinne et al., RTP: *A Transport Protocol for Real-time Applications*, IETF RFC 1889, IETF Audio/video Transport Working Group, January 1996.

A typical packet 10 conforming to the IP-based transport layer protocols, such as UDP and RTP, is shown in FIG. 1. The packet 10 is one packet in a plurality of related packets that form a stream of packets representing, for example, speech data being transferred over a packet-switched communication network such as the Internet. In general, the packet 10 may be made of a header section 12 and a payload section 14. The header 12 may have a number of header fields, as shown, including such fields as the source and destination addresses of the packet 10.

FIG. 2 illustrates a pertinent portion of an exemplary packet-switched communication network 20. A packet source 22, such as the Internet, provides a stream of packets 10 across a link 24 to an access technology 26. The access technology 26 may be any layer of communications protocol, such as the Global System for Mobile Communications (GSM), Time Division Multiple Access (TDMA), and Wideband Code Division Multiple Access (WCDMA), that provide access to a receiver over a radio interface. The access technology 26 processes the packets 10 for transmission over a link 28 to a receiver 29 such as, for example, a mobile unit. The link 28 may be any radio interface, such as a cellular link, between the access technology 26 and the receiver 29. The receiver 29 receives the packets 10 from the access technology 26, processes them, and forwards them to their intended application, for example, a speech codec.

With pure speech data packets, however, the transport layer header 12 may represent up to 70% of the packet 10, leaving little capacity for the payload 14. For cellular links, this inefficient use of bandwidth prevents IP-based speech transportation from becoming an economically viable alternative to circuit-switched services. To make an IP-based solution for pure speech economically feasible over cellular links, the amount of bandwidth required for the header 12 must be significantly reduced. Therefore, some degree of header compression or reduction is required on a per-hop basis.

The term header compression refers to the art of transparently minimizing the bandwidth consumed by the information in the headers on a per-hop basis. In general, the headers are compressed or otherwise reduced at the transmitter or compressor side and then reconstructed at the receiver or decompressor side. Compression is made possible by virtue of a high level of redundancy in the headers, both within the same data packet and between consecutive packets. This redundancy allows the header values to be reliably predicted at the receiver based on expected incremental changes from packet to packet. As a result, some of the header information may be omitted during transmission, and then reconstructed at the receiver based on the expected values.

When starting transfer of a new stream of packets, only the static information and the initial values of the dynamic information in the transport layer headers are transmitted. The static information need not be transmitted again, but changes in the dynamic information need to be sent as they occur. By sending only the changes (as opposed to all header values), the bandwidth required for transmitting the headers may be significantly reduced. The headers may then be reconstructed by predicting their values based on expected incremental differences from the previous header values and as updated by the transmitted changes. Random or unpredictable information, however, cannot be reconstructed in this manner and is usually transmitted entirely as-is.

When transmitting data, in general, safeguards are implemented to ensure the data is received correctly. One method of safeguarding transmitted data is to employ an error detection check or code to detect data that has been corrupted or otherwise damaged during transmission. The error detection code is calculated (using one of several well-known methods) over the entire block of data to be protected and then included as part of the transmitted message. At the receiving side, a new error detection code is calculated over the received data and compared to the included error detection code. If the newly calculated error detection code matches the included error detection code, then the data has been received correctly.

One well known type of error detection code is called a checksum. Checksums are used, for example, by the UDP and RTP transport layer protocols to detect errors in a single data packet. Such transport layer checksums are calculated to provide coverage for the entire data packet (e.g., header and payload), and are included in the transport layer header as one of the header fields 16 (shown in FIG. 1). Calculation of the checksum is performed by adding together all the octets of data in the packet to be transmitted. A similar process is repeated at the receiver side, and the two sums are then compared for a match, which means the data have been received correctly.

However, checksums are understood by those of ordinary skill in the art to be among the weaker types of error detection codes. For example, while an error occurring in one of the octets may be detectable with a checksum, an error in two different octets would likely go undetected. As such, checksums are generally not used in high reliability applications such as header compression algorithms.

Because the transport layer checksums are generally considered to be too weak, most header compression algorithms generate a separate, stronger error detection check or code, such as a CRC (Cyclic Redundancy Code), to protect header information. For example, ROCCO (Robust Checksum-Based Header Compression) is one of several presently available header compression algorithms that employ a CRC. CRC calculation is well-known to those of ordinary skill in the art and will be described only briefly here. Basically, the block of data to be protected, such as the full original packet header, is divided by a polynomial having a predetermined length. The CRC is simply the remainder resulting from that division.

It has been suggested for header compression algorithms such as ROCCO that a CRC size of about 10 bits is sufficient. The size, of course, may vary on a case-by-case basis depending on the particular application of the algorithm. In addition, up to 6 bits of original, uncompressed header information (e.g., the delta values) may also need to be transmitted with the CRC for correct header reconstruction. This results in a minimum of 16 bits, or 2 octets, of header overhead that must be transmitted along with the compressed header.

Furthermore, as mentioned above, one of the fields 16 in the transport layer header is a checksum field. This field also occupies 2 octets in most cases and is used to verify the correctness of the transport layer packet. IP version 4 (IPv4) provides an option to disable the checksum, but doing so may make the data in the packet unreliable. There is no such disable option in the new IP version, IPv6.

Because both the CRC and the checksum types of error detection codes are essentially random in nature, transmission of these codes must be made as-is. Therefore, for IPv6 and most applications of IPv4, a minimum of 4 octets (2 octets+2 octets) of header overhead per packet is required in order to transport IP-based speech over a radio interface such as a cellular link. Accordingly, it is desirable to be able to reduce this header overhead by as much as possible, but without compromising the integrity of the data transported.

The present invention advantageously provides a method and apparatus for reducing the header overhead without compromising data integrity.

SUMMARY OF THE INVENTION

The present invention is directed to a method and apparatus for replacing a transport layer error detection code and a header compression algorithm error detection code with a single error detection code. The replacement error detection code covers both the transport layer payload and the transport layer header. Such an arrangement reduces the amount of as-is or uncompressed information transmitted, thereby reducing the required bandwidth. The replacement error detection code is subsequently used to verify the correctness of both the reconstructed header and the payload.

In one aspect, the invention is related to a method of replacing a transport layer error detection code in a header compression algorithm. The method comprises the steps of calculating one error detection code which covers both a transport layer header and a transport layer payload, compressing the transport layer header in accordance with the header compression algorithm, including the error detection code with the compressed transport layer header, and transmitting the compressed transport layer header.

In another aspect, the invention relates to a system for replacing a transport layer error detection code in a header compression algorithm. The system comprises an error detection code calculator for calculating one error detection code for both a transport layer header and a transport layer payload, a header compressor for compressing the transport layer header in accordance with the header compression algorithm, and a transmitter for transmitting the compressed transport layer header.

A more complete appreciation of the present invention and the scope thereof can be obtained from the accompanying drawings (which are briefly summarized below), the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As mentioned previously, 4 octets of header overhead per data packet is normally required at present in order to transport IP-based speech data over a radio interface, such as a cellular link. The present invention reduces the amount of header overhead by replacing the header compression CRC and the transport layer checksum with one error detection code, referred to herein as a CRC+. Accordingly, the amount of header overhead may be reduced, as it would no longer be necessary to send both the header compression CRC and the transport layer checksum.

Figure 1:
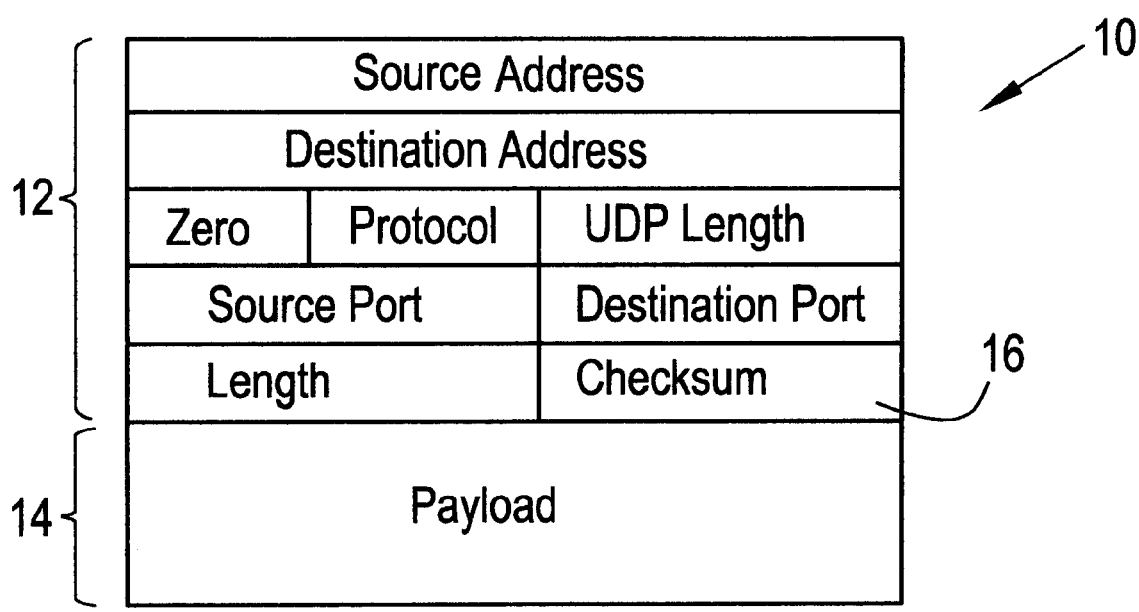
FIG. 1 illustrates a typical speech data packet.
Figure 2:
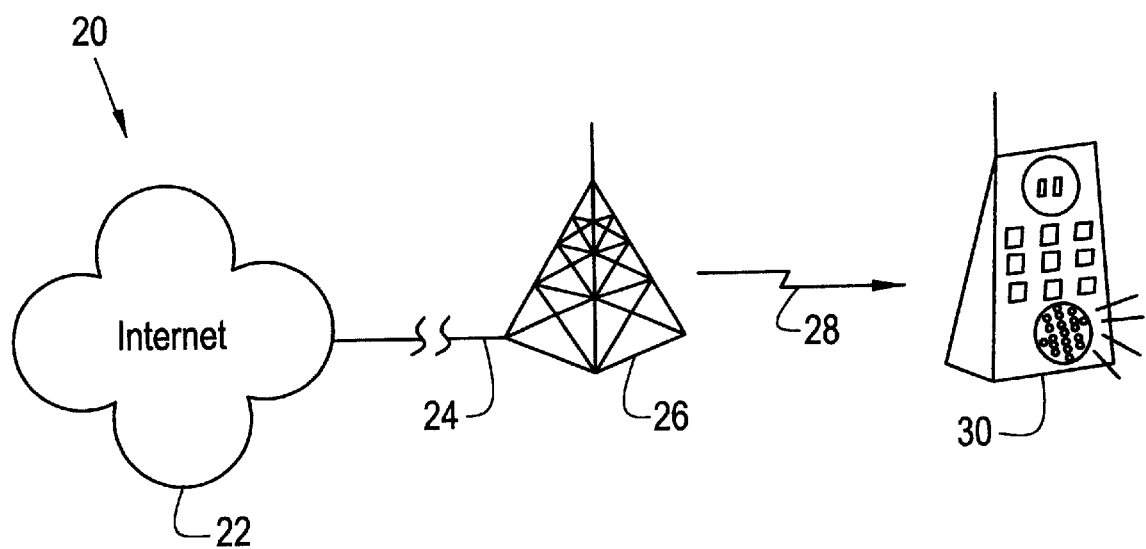
FIG. 2 illustrates a packet-switched communication environment.
Figure 3:
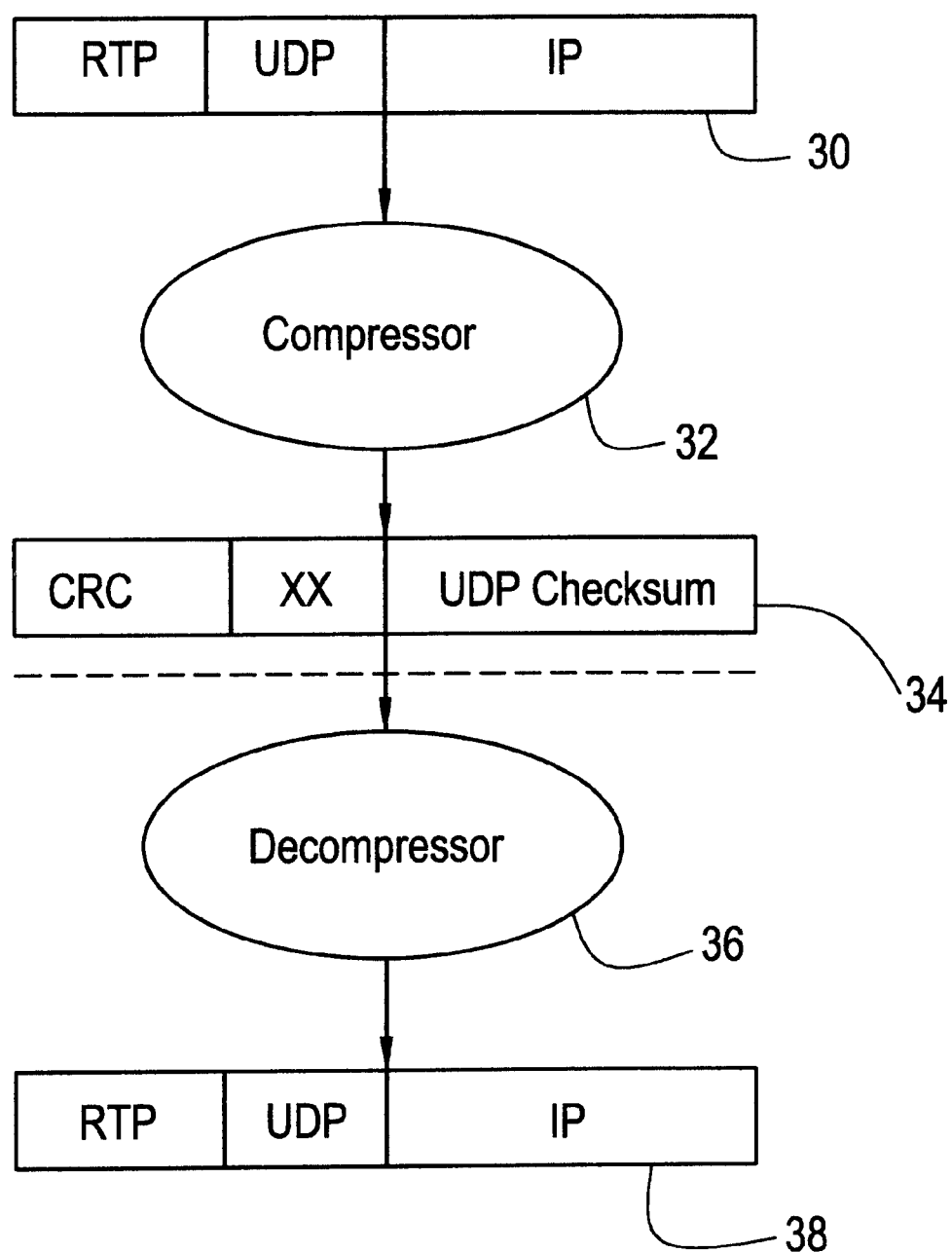
FIG. 3 illustrates a general header compression sequence.

FIG. 3 illustrates a typical sequence for compression of a transport layer header in accordance with the principles of the present invention using a compression algorithm such as ROCCO. A transport layer header 30 contains IP, UDP, and RTP header fields, as discussed hereinabove, and is typically 40 octets long in the original, uncompressed state. Compression of the header 30 is performed by a compressor 32 in accordance with known header compression routines, e.g., a ROCCO compressor. The resulting compressed header 34, in most cases, contains only the header compression CRC (10 bits) and the transport layer checksum (16 bits). As discussed, because these error detection codes are more or less random, they have to be transmitted as-is and cannot be compressed. In some cases, the compressed header 34 also includes some of the original header information (6 bits), designated here as XX. The compressed header 34 is then transmitted across the aforementioned radio interface 28 to receiver 89, as illustrated and discussed in connection with FIG. 2. At the receiver 29 side, a decompressor 36 reconstructs the compressed header 34 according to known header reconstruction algorithms, e.g., a ROCCO decompressor. As illustrated in FIG. 3, the reconstructed header 38 contains the original IP, UDP, and RTP header fields of the transport layer header 30.

Figure 4:
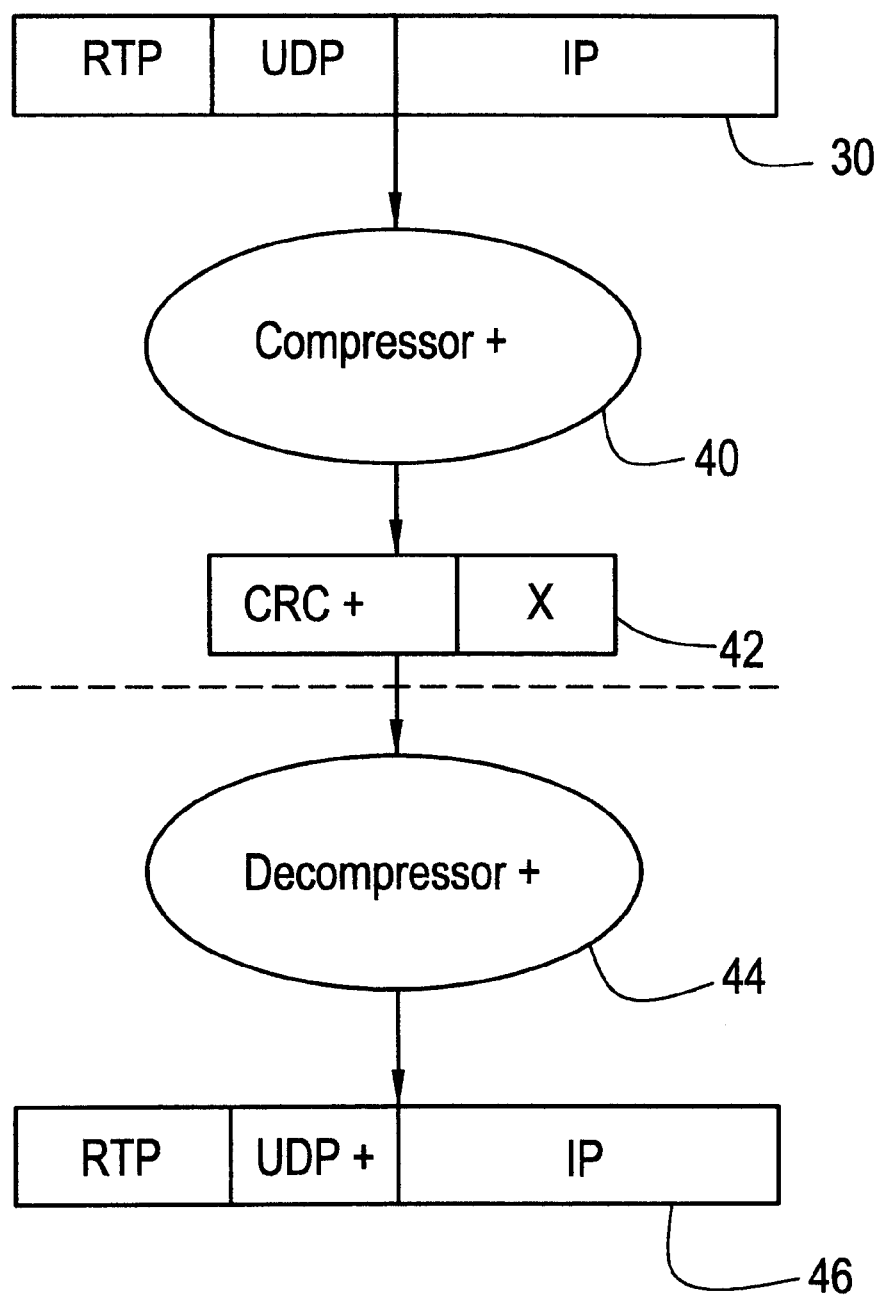
FIG. 4 illustrates a general header compression sequence according to an embodiment of the present invention.

FIG. 4 illustrates a header compression sequence according to an exemplary embodiment of the present invention. The full original, IP/UDP/RTP transport layer header 30 (shown in FIG. 3) is compressed by a compressor+ 40 of the present invention in accordance with known header compression algorithms (such as ROCCO). The result is a compressed header 42 having a CRC+ and, in some cases, also some of the original header information, shown here as X. In particular, the compressor+ 40 calculates a single CRC+ that provides protection not only for the transport layer header, but for the transport layer payload as well. As such, the CRC+ may be used to replace both the usual header compression CRC and the transport layer checksum.

In one exemplary embodiment, only the CRC+ is transmitted with the compressed header 42, thus the header overhead may be reduced to about 10 bits. In another exemplary embodiment, up to 6 bits of uncompressed original header information (shown as X) may also be included in the compressed header 42. This would bring the total header overhead to about 2 octets, which is significantly less than the 4 octets previously required.

In addition to reducing the header overhead, the CRC+ also has the advantage of being stronger than the original transport layer checksum. Thus, in one exemplary embodiment, the CRC+ may be used to more reliably verify the integrity of the data in the packet instead of the usual transport layer checksum.

Figure 5:
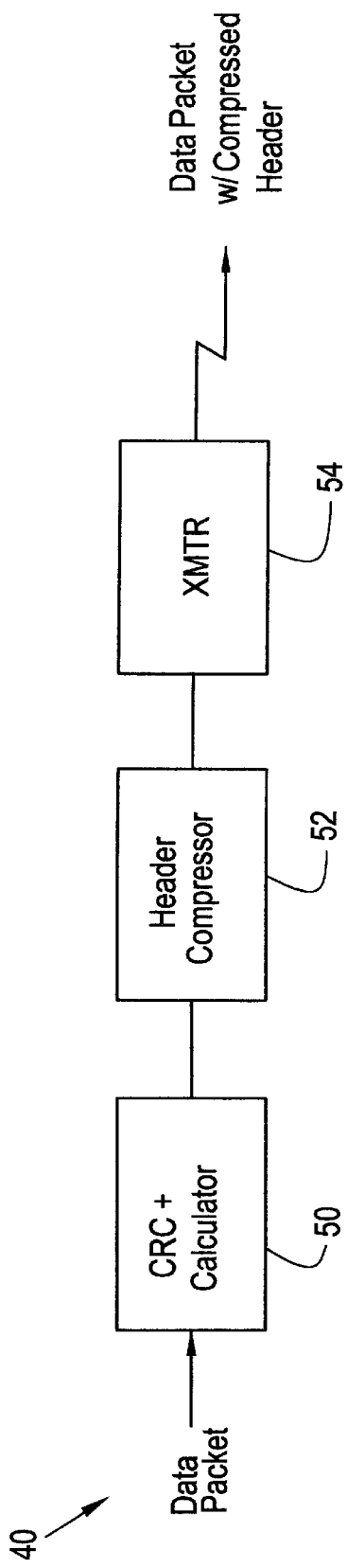
FIG. 5 illustrates a functional block diagram of a compressor according to the embodiment shown in FIG. 4.

FIG. 5 is an expansion of the compressor+ 40 (shown in FIG. 4) depicted as a functional block diagram. In general, a data packet is received at a CRC+ calculator 50 of the compressor+ 40. The CRC+ calculator 50 calculates a CRC+ over both the transport layer header and payload. The header is then compressed at the header compressor 52 according to a known header compression algorithm. The CRC+ along with the compressed header are then sent to a transmitter 54 where they are transmitted (with the payload) to a next destination, as illustrated. In practice, it should be clear to one of ordinary skill in the art that the CRC+ calculator 50, the header compressor 52, and the transmitter 54 may be implemented by one or more programmable integrated circuit devices such as a PLD, microprocessor, microcontroller, or ASIC.

Figure 6:
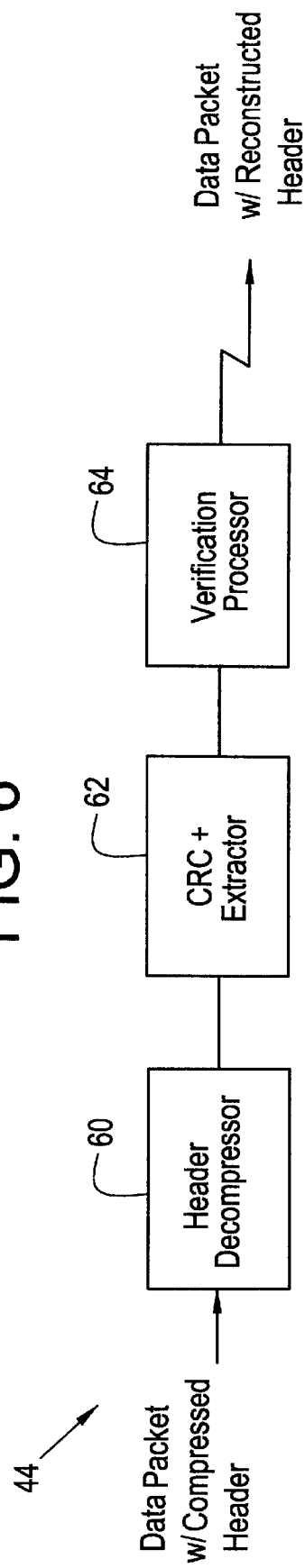
FIG. 6 illustrates a functional block diagram of a decompressor according to the embodiment shown in FIG. 4.

The components of a decompressor+ 44 (from FIG. 4) may also be implemented in a manner similar to that described for the compressor+ 40. These components are further illustrated in FIG. 6 and as described below. As shown, a data packet with a compressed header is received by a header decompressor 60. In one embodiment, the header decompressor 60 reconstructs the transport layer header in accordance with a known header compression algorithm. A CRC+ extractor 62 extracts the included CRC+ and calculates a new CRC+ on the reconstructed header. A verification processor 64 compares the new CRC+ with the included CRC+. If there is a match, the reconstruction process is considered to have been performed correctly. In another embodiment, the verification processor 64 also performs verification of the payload using the CRC+. Thus, in this embodiment, the integrity of the entire packet (header and payload) may be verified using one error detection code. Such verification would also have the advantage of being more reliable than verification using the weaker transport layer checksum. The packet, with the reconstructed header, is then sent to the intended application.

The foregoing description is of preferred embodiments for implementing the invention, and the scope of the invention should not necessarily be limited by this description. The scope of the present invention is instead defined by the following claims.

What is claimed is:

1. A method for replacing a transport layer error detection code in a header compression algorithm, the method comprising the steps of:

calculating one error detection code covering both a transport layer header and a transport layer payload;

compressing said transport layer header in accordance with said header compression algorithm;

including said error detection code with said compressed transport layer header; and transmitting said compressed transport layer header.

2. The method according to claim 1, further comprising reconstructing said transport layer header and verifying said reconstructed transport layer header using said error detection code.

3. The method according to claim 1, wherein said error detection code is a CRC.

4. The method according to claim 1, wherein said error detection code has a size of about 2 octets.

5. The method according to claim 1, wherein said transport layer is an IP-based transport layer.

6. The method according to claim 5, wherein said IP-based transport layer includes a transport layer checksum in said transport layer header, and said error detection code is calculated to cover said checksum.

7. A system for replacing a transport layer checksum in a header compression algorithm, said system comprising:

an error detection code calculator for calculating one error detection code covering both a transport layer header and a transport layer payload;

a header compressor for compressing said transport layer header in accordance with said header compression algorithm; and a transmitter for transmitting said compressed transport layer header.

8. The system according to claim 7, further comprising a header decompressor for reconstructing said transport layer header.

9. The system according to claim 7, further comprising a verification processor for verifying said reconstructed transport layer header using said error detection code.

10. The system according to claim 7, wherein said error detection code is a CRC.

11. The system according to claim 7, wherein said error detection code has a size of about 2 octets.

12. The system according to claim 7, wherein said transport layer is an IP-based transport layer.

13. The system according to claim 12, wherein said IP-based transport layer includes a transport layer checksum in said transport layer header, and said error detection code is calculated to cover said checksum.

* * * * *